(12) United States Patent
Harper

(10) Patent No.: US 10,328,356 B1
(45) Date of Patent: Jun. 25, 2019

(54) ASSEMBLING BEADS ON A BEADING BOARD

(71) Applicant: Patrick Royce Edmund Dubois Harper, Hawaiian Gardens, CA (US)

(72) Inventor: Patrick Royce Edmund Dubois Harper, Hawaiian Gardens, CA (US)

( * ) Notice: Subject to any disclaimer, the term of this patent is extended or adjusted under 35 U.S.C. 154(b) by 202 days.

(21) Appl. No.: 15/606,926

(22) Filed: May 26, 2017

(51) Int. Cl.
| | |
|---|---|
| *G09B 19/00* | (2006.01) |
| *A63H 33/08* | (2006.01) |
| *B44B 9/00* | (2006.01) |
| *B44C 3/12* | (2006.01) |
| *A63H 33/04* | (2006.01) |
| *A63H 33/06* | (2006.01) |

(52) U.S. Cl.
CPC ............. *A63H 33/08* (2013.01); *B44B 9/00* (2013.01); *B44C 3/12* (2013.01); *A63H 33/04* (2013.01); *A63H 33/06* (2013.01)

(58) Field of Classification Search
USPC .................................. 434/81, 84, 96, 98
See application file for complete search history.

(56) References Cited

U.S. PATENT DOCUMENTS

| | | | | |
|---|---|---|---|---|
| 5,704,789 A | * | 1/1998 | Yang ..................... | B44C 3/123 221/185 |
| 8,827,711 B2 | * | 9/2014 | Davis, II ............... | G09F 5/02 434/96 |
| 9,320,330 B2 | * | 4/2016 | Cooke .................... | A63F 9/06 |
| 10,118,436 B2 | * | 11/2018 | Skinner ................. | B44C 1/28 |
| 2005/0178693 A1 | * | 8/2005 | Gupta ................... | D03D 15/0022 206/574 |
| 2007/0077326 A1 | * | 4/2007 | Smith .................... | B29C 43/52 425/407 |
| 2009/0260224 A1 | * | 10/2009 | Wilcox .................. | B44C 1/18 29/700 |

OTHER PUBLICATIONS

"Beginner's Guide to Perler Beads", Jul. 6, 2013 [retrieved online Feb. 7, 2019].*
"ABC Pegboards used for 5×5mm DIY Fuse Beads, Square, Clear, 147×147×5mm(X-DIY-R014-01)", NBEADS, retrieved from Internet on May 26, 2017, http://www.nbeads.com/p-1337333-abc-pegboards-used-for-5×5mm-diy-fuse-beads-square.html#this, copyright 2011-2017, 2 pages.

* cited by examiner

*Primary Examiner* — Kurt Fernstrom
(74) *Attorney, Agent, or Firm* — Fish & Richardson P.C.

(57) ABSTRACT

An apparatus for holding beads in a pattern has a beading board having a base with a bottom side and a top side. A plurality of posts project out from the top side of the base and are configured to extend through holes in beads to hold the beads in lateral position relative to each other. The apparatus has a perforated panel having perforations that are larger in width than the posts, and the perforated panel is configured to be removably placed on the beading board with the posts extending through the perforations. The perforated panel slides along the posts and sliding of the perforated causes beads placed on the posts to slide vertically along the length of the posts.

20 Claims, 10 Drawing Sheets

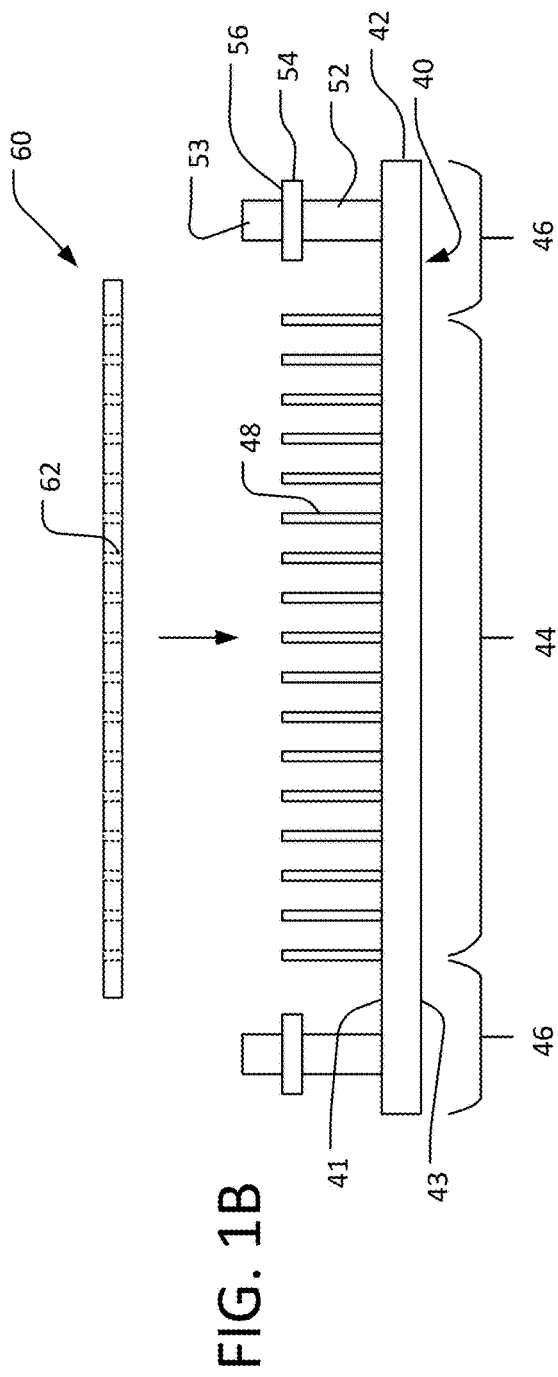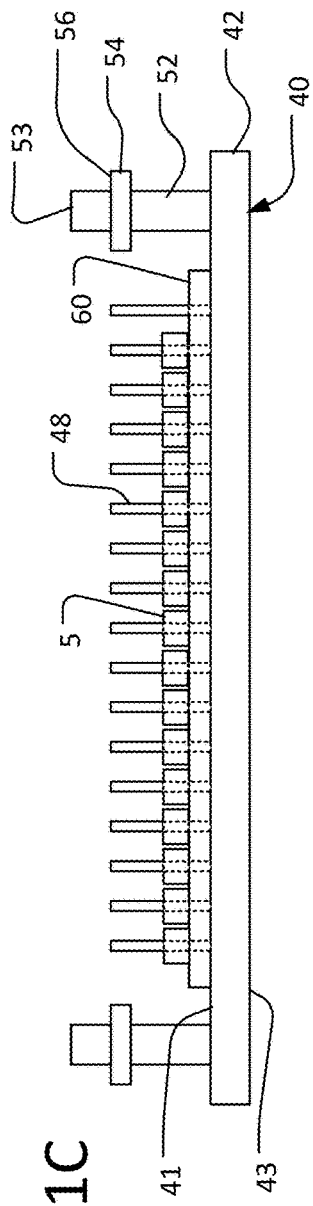
FIG. 1B
FIG. 1C

ASSEMBLING BEADS ON A BEADING BOARD

TECHNICAL FIELD

This application relates to assembling a layer of beads using a beading board. The layer of beads can then be fused. Fused beads are used in jewelry and other ornaments, as well as art and craft projects.

BACKGROUND

Beads can be fused together to create works of art that can be used in jewelry, keychains, and other ornaments. In particular, hot melt cylindrical craft beads are hollow, cylindrical beads that can be melted and fused together when exposed to heat; some of the commonly known brands of hot melt beads are PERLER®, HAMA®, and NABBI®. Hot melt beads come in a wide variety of colors and sizes, with the standard hot melt bead's width being approximately that of a pencil eraser. Hot melt beads are frequently used to make two-dimensional images in which different colors of beads are arranged in a specific pattern to resemble, for example, a flag, a piece of fruit, a flower, and the like.

To create a hot melt bead pattern, a user arranges hot melt beads into a pattern on a pegboard, one bead at a time. The pegboard can be specifically configured and shaped to resemble the object being made, or can be rectangular, circular, or some other generic shape. The pegboard includes a plurality of upwardly extending pegs capable of holding a layer of beads; each peg is sized to fit within the central opening of an individual bead. The pegs are arranged and spaced about the pegboard so that when individual beads are placed on adjacent pegs, the beads are touching or very nearly touching one another. After the user has arranged the desired pattern on the pegboard, the user typically covers the beads with wax paper and applies heat to the wax paper, which melts the beads and fuses them together.

SUMMARY

One aspect features an apparatus for holding a layer of beads. The apparatus has a beading board having a base (e.g., cardboard, particle board, wood, plastic, or metal), which has a bottom side and a top side. The beading board also has a plurality of posts that project out from the top side of the base and that are configured to extend through holes in beads to hold the beads in lateral position relative to each other. The apparatus has a perforated panel having perforations that are larger in width than the posts. The perforated panel is configured to be removably placed on the beading board with the posts extending through the perforations; the perforated panel is configured to slide along the posts and to contact and urge the beads such that sliding of the perforated panel along the posts causes beads placed on the posts after the perforated panel to slide vertically along the length of the posts. In some examples, each post is configured to accept a plurality of beads along its length. In some examples, the perforated panel has a handle that can be grasped and used for manually moving the perforated panel along the length of the posts.

In some constructions, the apparatus has a frame for holding an adhesive sheet in a fixed position relative to the base, wherein the frame is removably mountable on the beading board. The beading board includes a central zone on the top side of the base, wherein the central zone contains the posts, a perimeter zone on the top side of the base surrounding the central zone, the perimeter zone containing a plurality of support members that project out from the top side of the base. Each support member has a top portion, a bottom portion, and a flange that perpendicularly protrudes from the support member between the top portion and the bottom portion, wherein the flanges are configured to support the frame. The frame has a plurality of support member apertures that are configured to slide vertically along the length of the top portions of the support members and rest on top of the flanges.

In some constructions, the perforated panel is configured to rest on top of only the central zone. The frame may have a central aperture that is configured to receive the perforated panel, a panel-receiving side that is configured to face the perforated panel, wherein the panel-receiving side is configured to rest on top of the support member flanges, and a sheet-receiving side that is configured to face away from the perforated panel.

In some constructions, the apparatus has a locking mechanism for securing the frame and adhesive sheet onto the support members. E.g., the locking mechanism may be a bolt that is configured to screw onto a threaded portion of a support member, an end cap that is configured to receive a support member, a swiveling arm that is affixed to the base and is configured to pivot into a position covering the top portion of a support member, a pressure-sensitive spring clamp, or a manual switching between a locked and unlocked position.

In some implementations, the apparatus has an assist board. The assist board has an assist panel and a plurality of assist posts that project away from the assist panel, wherein the central zone of the base has holes located between the posts and the assist posts are capable of being inserted through the holes of the base by applying force to the assist board thereby urging the perforated panel towards the frame. The assist posts are configured to enter the holes through the bottom side of the base and exit the holes through the top side of the base.

In some implementations, the apparatus has a dowel. The dowel has a rod that is configured to receive beads having the topological shape of a torus. The dowel also has a first end for grasping the dowel and a second end for loading one or more beads onto the rod. The dowel's second end is configured to contact a post, thereby allowing the one or more beads to slide along the length of the rod and ultimately down the length of the post towards the base. In some examples, the dowel's second end has a concave groove and the post has a convex tip, wherein the concave groove is configured to complementarily accept the convex tip. The first end may be a handle having a width that is greater than the width of the rod.

Another aspect features a method for fusing beads into a specific pattern. The method includes placing a plurality of beads on posts that extend from a beading board through perforations in a perforated panel. The method also includes placing an adhesive sheet in contact with ends of the posts and moving the perforated panel such that the perforated panel slides along the posts and presses the plurality of beads against the adhesive sheet. Another step in the method involves applying heat to the plurality of beads that are adhered to the adhesive sheet to cause the beads to fuse together.

In some implementations, the step of moving the perforated panel is accomplished by sliding assist posts on an assist board through holes in the beading board, so that the assist posts press against the perforated panel and move the perforated panel towards the adhesive sheet.

In some implementations, the step of applying heat (e.g., using an iron, heat gun, or oven.) to the plurality of beads on the adhesive sheet further involves placing a protective material over the plurality of beads. E.g., the protective material may be wax paper or parchment paper.

In some implementations, the step of placing the plurality of beads onto the posts is accomplished using a dowel, wherein a bead slides along the length of the dowel and then down the length of a post on the beading board. In some examples, the dowel is configured to hold a plurality of beads, the posts are configured to accept a plurality of beads, and the beading board is capable of holding multiple layers of a plurality of beads. Certain aspects and implementations may have (but are not limited to) the following advantages.

For example, in some constructions each post is configured to accept a plurality of beads along its length, which allows the apparatus to hold multiple layers of beads at the same time and allows for the efficient fusing of beads using a perforated panel. Additionally, when making multiple copies of a beading patterns, the user would need to refer to a color-pattern only once for each bead position; for subsequent beads the user can refer to the color of the bead already in place on the post. Another example of an advantage of having each post configured to accept a plurality of beads along its length is that this construction may prevent beads from easily being dislodged from the apparatus. Similarly, posts configured to accept a plurality of beads are longer than posts that accept only one bead, and this allows for incomplete bead designs to be transported while reducing the probability of beads being dislodged.

As another example, an assist board can be stored on top of incomplete bead designs and can prevent the beads from being dislodged during transport.

As another example, using a perforated panel and a frame may allow for the swift and uniform application of a layer of beads onto an adhesive sheet.

As another example, use of a dowel may allow some users to operate the apparatus more efficiently, e.g. because some constructions can have posts positioned close to each other and the placement of beads onto a particular post using a dowel may require less dexterity than the manual placement of beads onto a particular post. Another example of an advantage of the dowel is that in some embodiments the dowel can hold multiple beads, allowing multiple beads to be placed on the posts during one step.

As another example, some implementations may use an assist board to urge the perforated panel towards the frame. One advantage of the assist board is that it may apply pressure more homogeneously to the perforated panel, which may be useful in many situations (such as in larger constructions, e.g. where the perforated panel is more than approximately 6.5 inches).

These are only some examples of some of the advantages of certain aspects and implementations. The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1B is a side view of the board and panel of the apparatus of FIG. 1A.

FIG. 1C is a side view of a board and panel having a layer of beads placed thereon.

Like reference symbols in the various drawings indicate like elements.

DETAILED DESCRIPTION

Figure 1A:
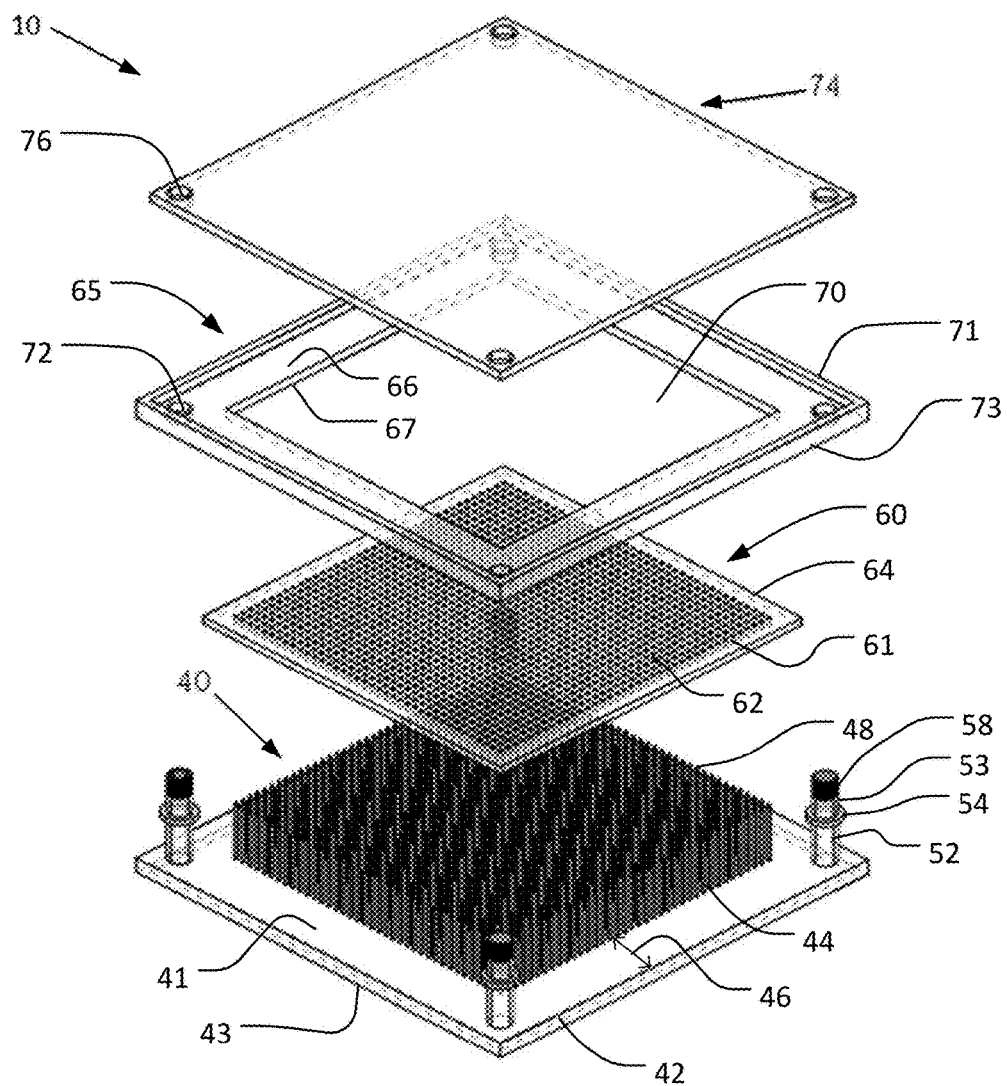
FIG. 1A is an exploded isometric view of a board, a perforated panel, and a frame with a backing panel, in some aspects of the apparatus.
Figure 1D:
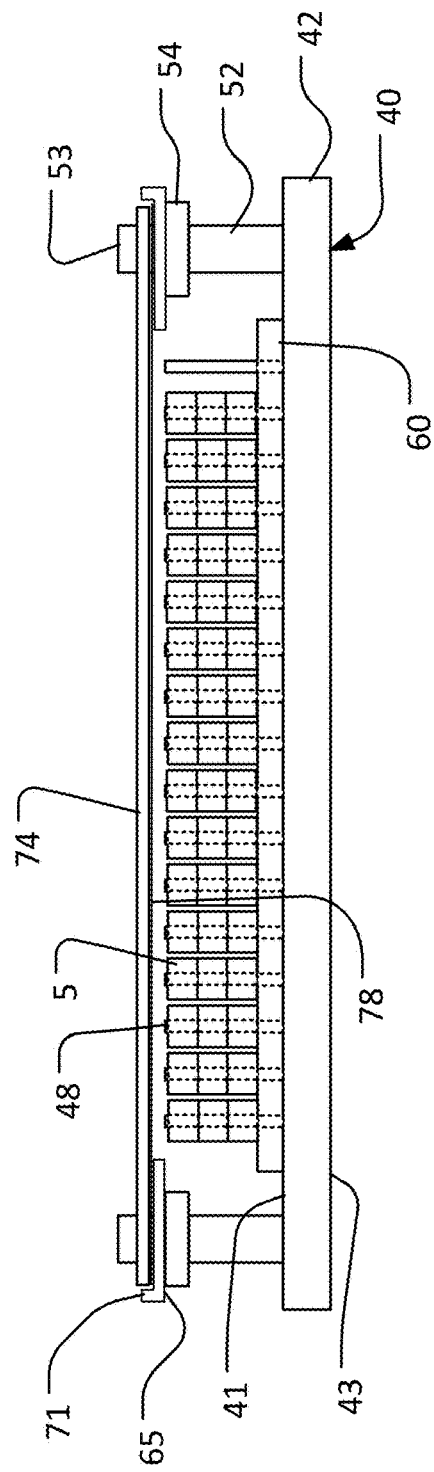
FIG. 1D is a side view of a board and panel having multiple layers of beads, a frame, backing panel and adhesive sheet placed thereon.

To create a hot melt bead pattern, a user conventionally arranges hot melt beads into a pattern on a pegboard, one bead at a time. Unfortunately, pegboards are designed to hold only one layer of beads at a time. Using the beading board apparatus disclosed here, a user can place multiple layers of beads on a beading board at once, which saves time because the user needs to focus on each bead position only once (e.g., a user may need to refer to a color pattern only one time for each bead position, rather than multiple times for each bead position). Thus the beading board apparatus disclosed here allows for the efficient creation of multiple copies of hot melt bead patterns.

Structure

Referring to FIGS. 1A-3, a beading board apparatus 10 includes a board 40, a perforated panel 60, a frame 65, and backing panel 74.

The board 40 includes a base 42. The base 42 can be made from materials such as cardboard, particle board, wood, plastic and/or metal. The base 42 can be made into a shape such as a square, rectangle, or circle. The board 40 has a perimeter zone 46 located at an edge of the base 42 and a central zone 44 that is surrounded by the perimeter zone 46. In some implementations, the perimeter zone 46 extends along all sides, e.g., completely around, the central zone 44. In some implementations, the perimeter zone could be on just two opposite sides of the central zone 44. A width of the perimeter zone 46 can be about ¾ of an inch to 1 inch. The base 42 has a top side with a top surface 41, and a bottom side with a bottom surface 43.

Within the central zone 44, a plurality of posts 48 project upward from the top surface 41 of the base 42, e.g., the posts 48 can extend along a direction perpendicular to the top surface 41. Each post 48 is configured to receive at least one bead (e.g., commercial hot melt beads such as PERLER®, HAMA®, and NABBI®). The posts 48 can be disposed in an area that defines a shape such as a square, a rectangle, a triangle, or a circle, although other shapes are possible, e.g., shapes that represent animals, etc. The perimeter of the area can provide the perimeter of the central zone 44. The posts 48 can be uniformly spaced within the area, e.g., in a regular rectangular or hexagonal array. Some shapes, such as a ring pattern, can require non-uniform spacing of the posts 48. The posts 48 are typically equal in height; the height can be between 5.25 and 5.5 centimeters. The width of the posts varies according to bead size, but can be 2.1 millimeters. The posts can be made from materials such as metal, plastic, and wood.

The perforated panel 60 is configured to be removably placed on the board 40 and includes a central area 61 with perforations 62 and a perimeter 64 that lacks the perforations. The perforations 62 are sized to be just slightly larger than the posts 48 so that the posts 48 will fit comfortably through the perforations 62. This permits the panel 60 to slide along the posts 48 of the board 40.

As shown in FIG. 1C, assuming the panel 60 is placed on the board 40 before the beads 5, the beads 5 will rest on the panel 60, which will rest on the base 42. Thus, sliding the perforated panel 60 along the posts 48 also causes any beads 5 placed on the posts 48 to slide vertically along the length of the posts 48.

The perimeter 64 of the panel 60 can project beyond the board 40 and serve as a handle for manually moving the perforated panel 60 along the posts 48. In another implementation, the perforated panel 60 has handles protruding from the perimeter 64 (e.g., rope handles, metal handles, and plastic handles).

In some implementations, the board 40 also includes support members 52. The support members 52 have flanges 54, and each flange 54 has a top surface 56 that extends parallel to the top surface 41 of the base 42. The support members 52 can also have top portions 53 that extend above the flanges 54. The flanges 54 are configured to support a frame 65 that can rest on the surfaces 56 of the flanges 54. The panel 60 can be shaped so that the support members 52 do not impede the panel 60 from sliding to the bottom of the posts 48 and resting on the top surface 41.

Figure 2:
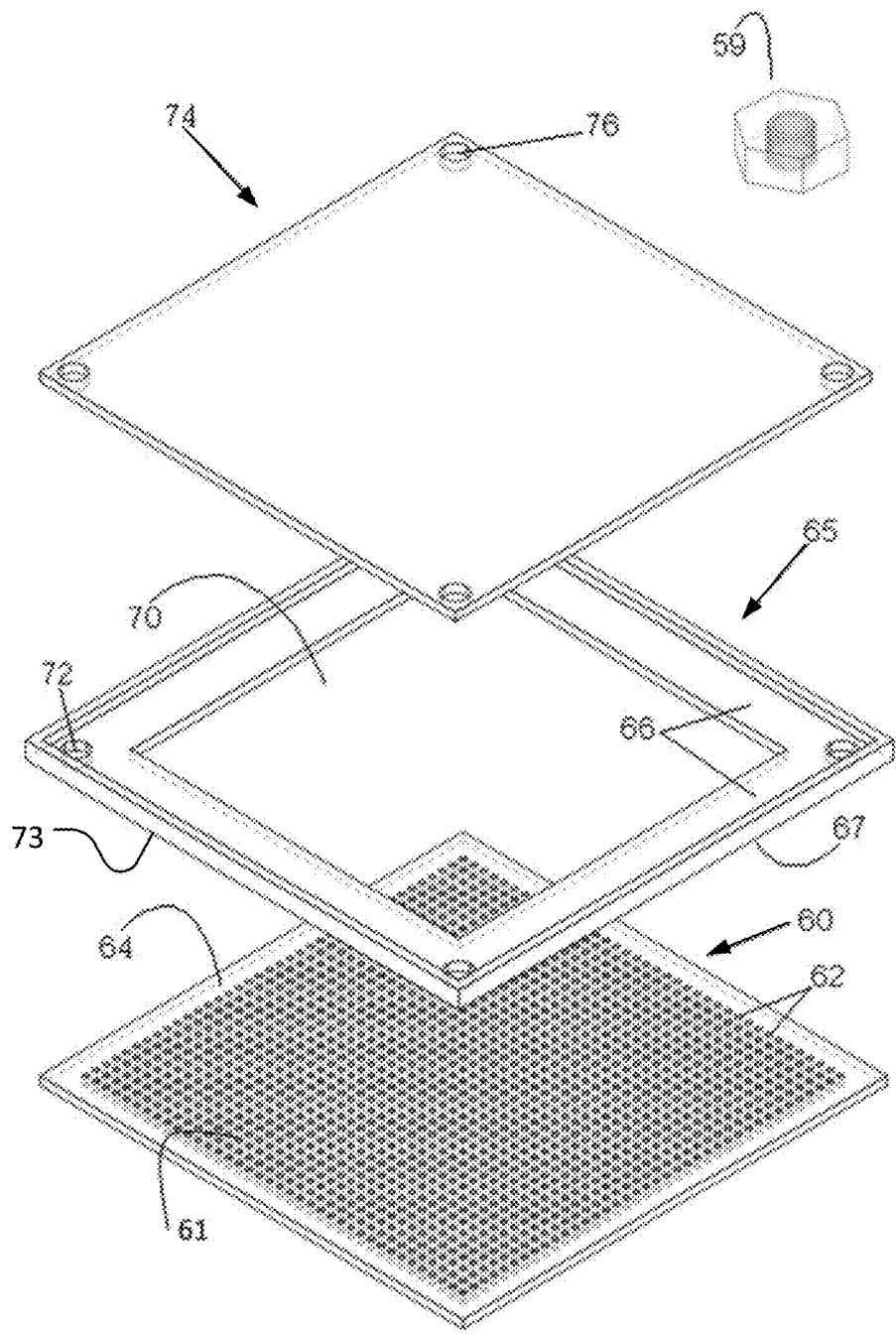
FIG. 2 is an isometric view of a perforated panel, frame, backing panel, and locking mechanism.
Figure 3:
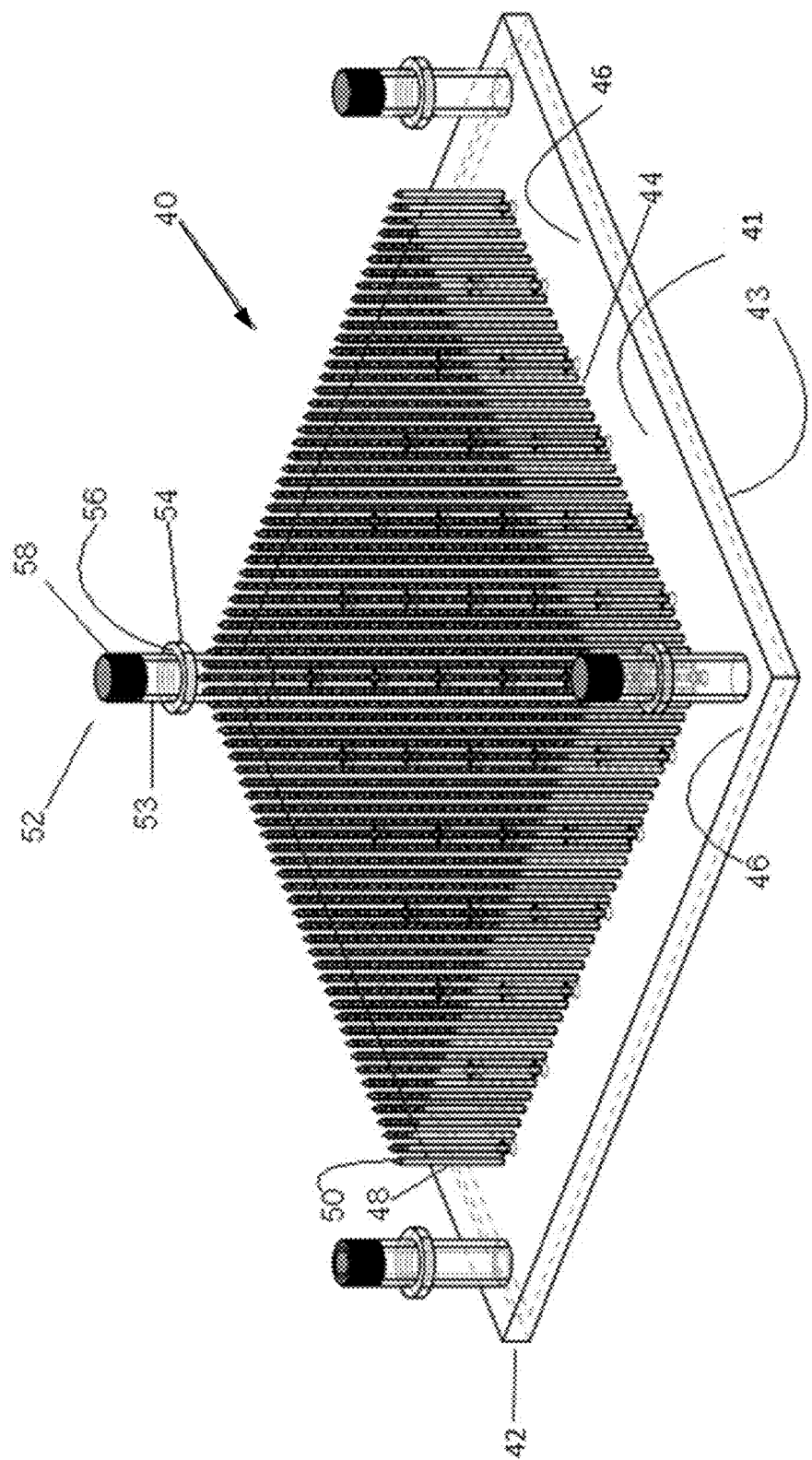
FIG. 3 is an isometric view of one construction of a board.

Referring to FIGS. 1A and 2, the frame 65 is a substantially flat body that has a central aperture 70, a sheet-receiving side 66, and a panel-receiving side 67. The area of the central aperture 70 is at least as large as the area of the central zone 44 of the base 42. Due to the central aperture 70, the frame 65 is a substantially annular body, although it could be a circular annulus, a square annulus, etc. The width of the annulus can be uniform and mirror the width of the perimeter zone 46 of the base 42. The width of the annulus can be about ¾ inch to 1 inch. The length of each side of the frame 65 can be approximately 7 to 7.5 inches.

The edge of the sheet-receiving side 66 of the frame 65 can have an upwardly projecting rim 71 to laterally constrain the adhesive sheet 78 that will fit within the frame 65. Similarly, the edge of the panel-receiving side 67 of the frame 65 can have a downwardly projecting rim 73 sized to just fit around and be laterally constrained by the panel 60.

The frame 65 can also have support member apertures 72 that are configured to slide vertically along the length of the top portions 53 of the support members 52 of the board 40 until the body of the frame 65 rests on the top surface 56 of the flanges 54. The frame 65 can be configured to be removably coupled to the board 40 using a locking mechanism, such as a bolt 59 that screws onto a threaded portion 58 of a support member 52.

The backing panel 74 is a substantially flat body that has the same shape as frame 65 (or slightly smaller to fit within the rim 71 of the frame 65). The backing panel 74 has apertures 76 that align with the apertures 72 of the frame 65. Like the apertures 72 of the frame 65, the apertures 76 of the backing panel 74 are configured to slide vertically along the length of the top portions 53 of the support members 52 of the board 40 until the body of the frame 65 rests on the top surface 56 of the flanges 54. An adhesive sheet 78 (see FIG. 4) is configured to be sandwiched between the frame 65 and the backing panel 74. Like the frame 65, the backing panel 74 can be configured to be removably coupled to the board 40 using a locking mechanism, such as a bolt 59 (see FIG. 2) that screws onto a threaded portion 58 of a support member 52. In this configuration, the adhesive sheet 78 can be held in contact with the convex tips 50 (see FIG. 8) of the posts 48, or can be slightly separated (by less than the height of a bead) from the convex tips 50.

Figure 4:
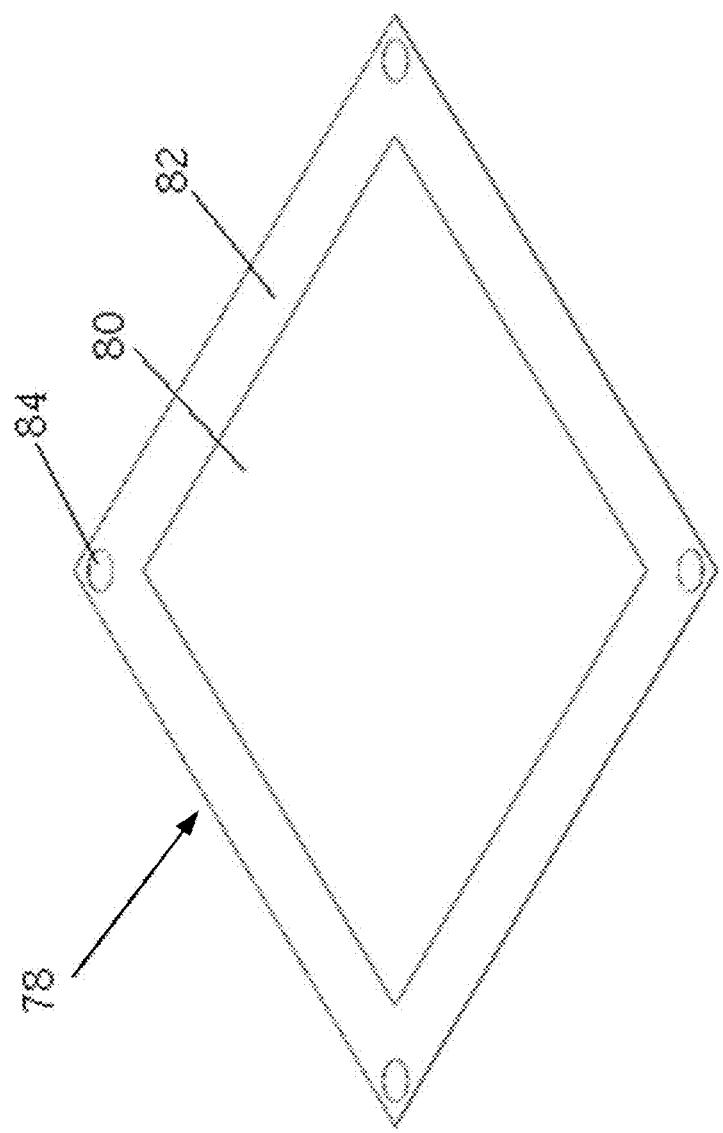
FIG. 4 is an isometric view of one construction of an adhesive sheet.

Referring to FIG. 4, an adhesive sheet 78 is configured to rest on the sheet-receiving side 66 of the frame 65. The edges of the adhesive sheet 78 can be clamped or sandwiched between the sheet-receiving side 66 of the frame 64 and the backing panel 74. One side of the adhesive sheet 78 is coated with an adhesive material. The adhesive material is configured to adhere to beads. Sliding the perforated panel 60 along the posts 48 causes any beads placed on the posts 48 to slide vertically along the length of the posts 48, e.g. towards the adhesive sheet 78. The adhesive sheet can be provided by, e.g. scotch tape, masking tape, or packing tape.

In some implementations, the adhesive sheet 78 has an adhesive zone 80 and a border 82 (e.g., a non-adhesive border) surrounding the adhesive zone 80. The border 82 of the adhesive sheet 78 is configured to rest on the sheet-receiving side 66 of the frame 65. The adhesive sheet 78 is configured to be sandwiched between the frame 65 and the backing panel 74. In some implementations, the adhesive sheet 78 includes support member apertures 84; the top portions 53 of the support members 52 will fit through the apertures 84 when the frame 74, adhesive sheet 78 and backing panel 74 are lowered onto the board 40.

Together, the frame 65, the backing panel 74, and the adhesive sheet 78 are configured to slide vertically along the length of the top portions 53 of the support members 52 of the board 40 and rest on the top surface 56 of the flanges 54.

Returning to FIGS. 1A, 2 and 4, the frame 65, backing panel 74, and adhesive sheet 78 can be secured to the support members 52 using a locking mechanism, such as a bolt 59 that screws onto a threaded portion 58 of a support member 52. Other locking mechanisms are possible, e.g., an end cap that is configured to receive a support member 52. The end cap could be plugged by the support member 52, or could be secured other ways, e.g.: magnetically, using Velcro, using a hook that protrudes from the end cap and that can be secured to a loop protruding from the support member 52 (where the hook slides in the loop), or using a needle that protrudes from the end cap and that can plug into a small hole in the top portion 53 of the support member 52 (e.g., where the top portion 53 is made of rubber). Other examples of locking mechanisms include a swiveling arm that is affixed to the base 42 and is configured to pivot into a position covering the top portion 53 of a support member 52, a pressure-sensitive spring clamp that is built into the support member 52, and manual switching between a locked and unlocked position.

Figure 5:
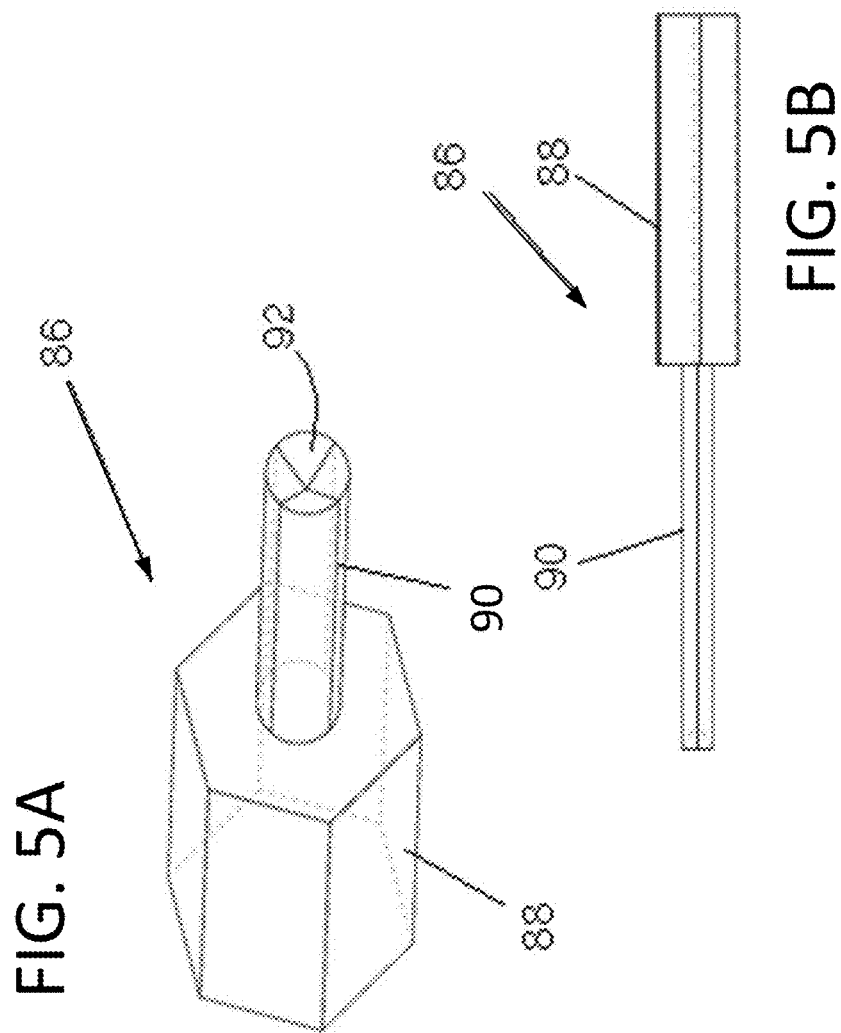
FIG. 5A is an isometric view of one example of a dowel.
FIG. 5B is a side view of one example of a dowel.

Referring to FIGS. 5A and 5B, in some implementations, a dowel 86 is used to place beads onto the posts 48. The beads are slidable onto and along the rod 90 of the dowel 86. In some examples, the dowel 86 has a handle 88 for holding the dowel. Another advantage of the handle 88 is that beads can rest on the handle 88 after sliding along the rod 90. The dowel can have a concave groove 92 that is accepted by a convex tip 50 (see FIGS. 3 & 8) of a post 48.

Figure 6:
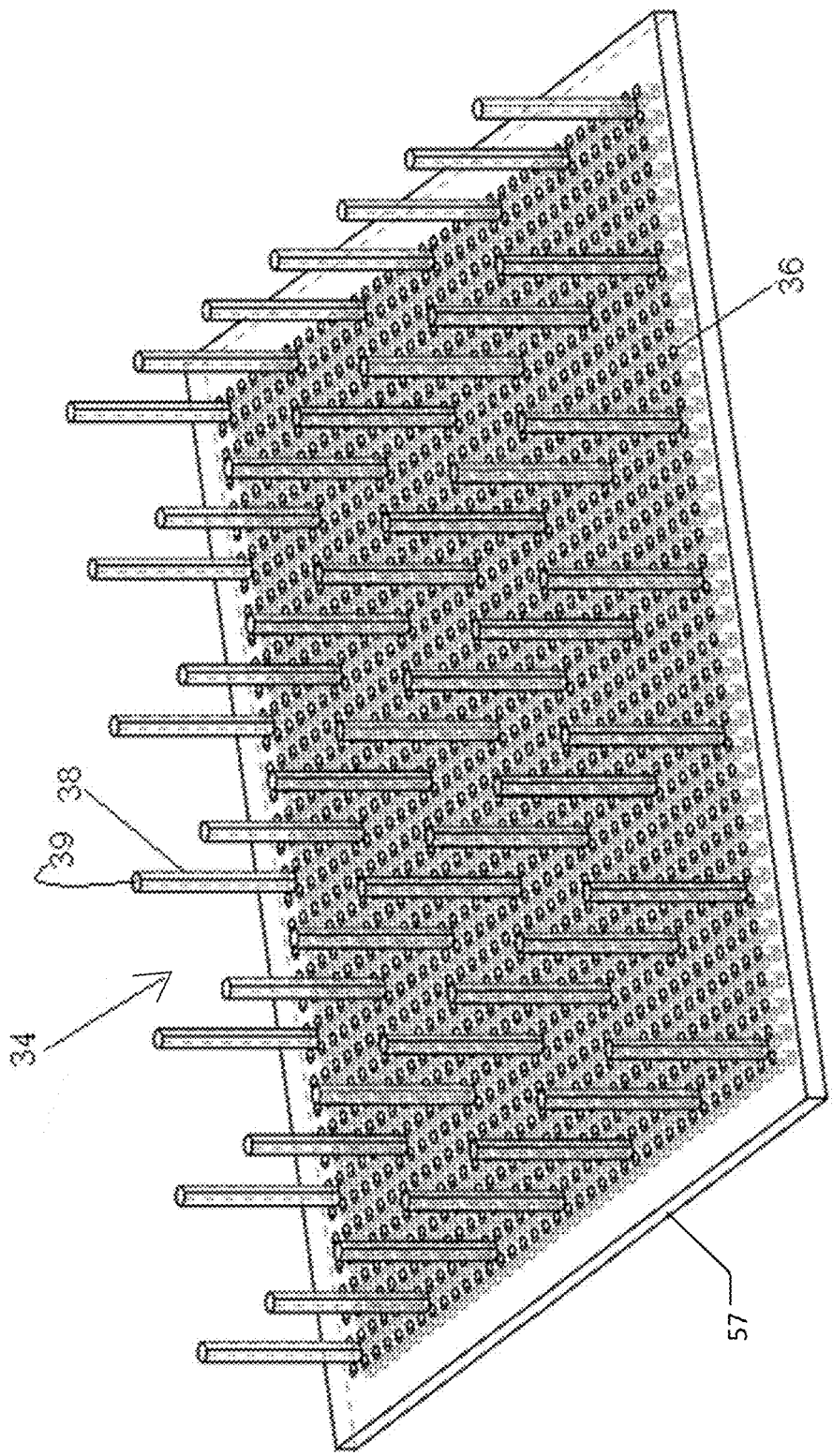
FIG. 6 is an isometric view of one example of an assist board.
Figure 7:
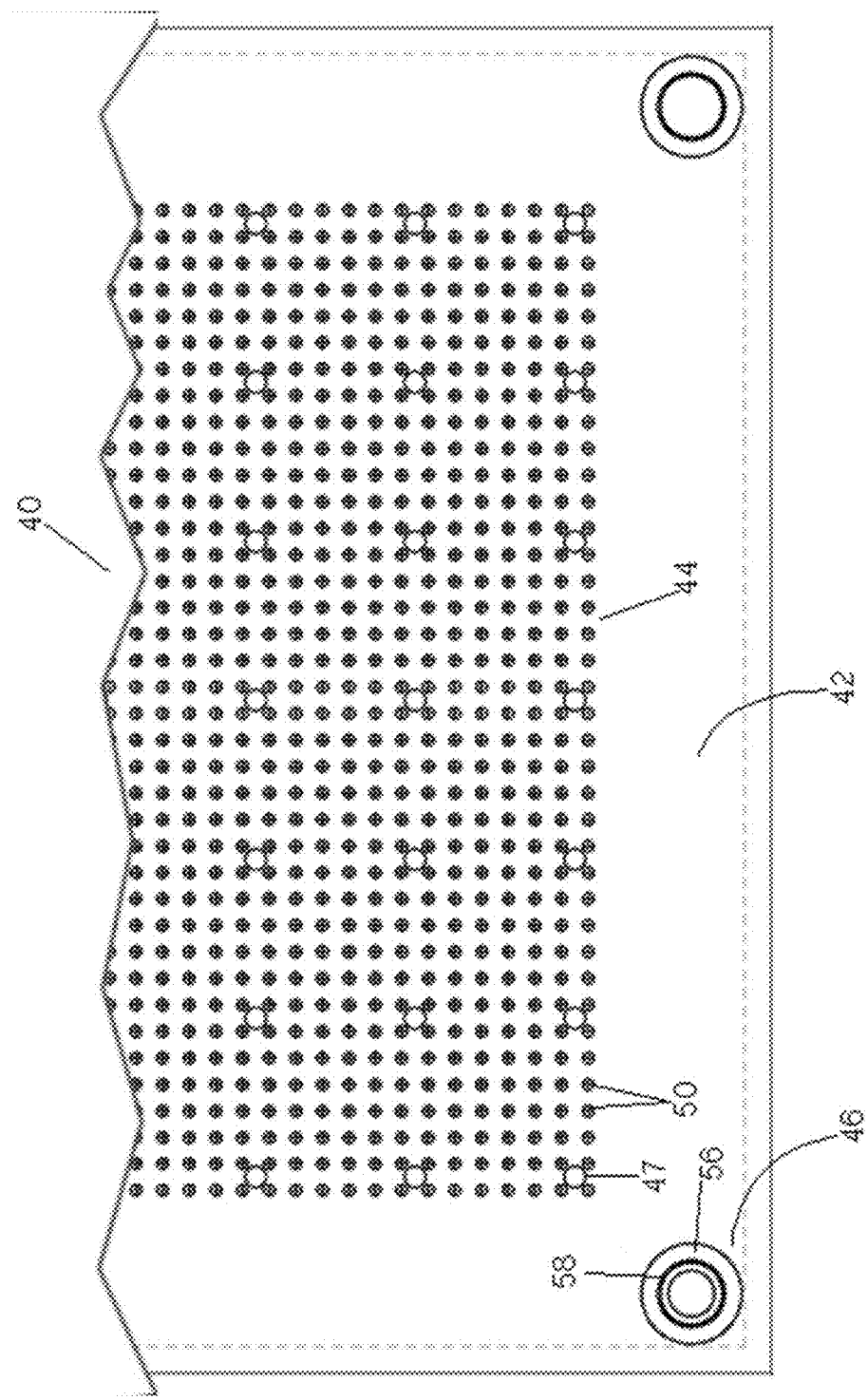
FIG. 7 is a top-down view of one construction of a board.
Figure 8:
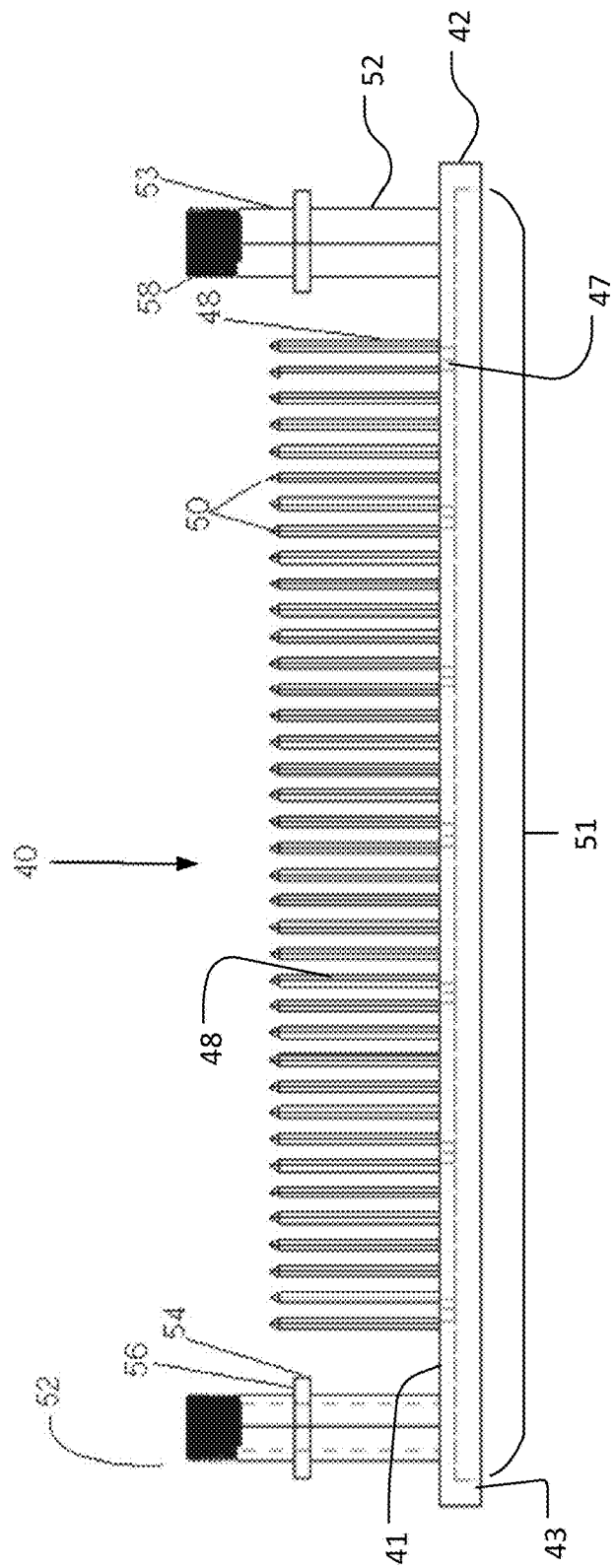
FIG. 8 is a side view of a board having a recess.

Referring to FIGS. 6-8, in some implementations of the beading board apparatus, an assist board 34 is used to urge the perforated panel 60 along the posts 48 toward the adhesive sheet 78. The assist board 34 is typically the same shape as the base 42, and is generally smaller than the base 42. The assist board 34 includes an assist base 57 and assist posts 38 that project upwardly from the assist board 34. The assist base 57 can be a rigid material, such as wood, plastic or metal. The assist board 34 has assist posts 38, and each assist post 38 has a top 39. The assist posts 38 are spaced uniformly. The assist posts 38 are long enough to be inserted into the holes 47 of the base 42 and cause the perforated panel 60 to press a layer of beads onto the adhesive sheet 78, e.g., the assist posts 38 can be between 62.5 and 72 millimeters in height. In some instances, the base 42 has a recess 51 that is the same general shape as the assist board 34. The recess 51 can accommodate the assist base 57 of the assist board 34 because the assist base 57 can slide into the recess 51 and fit snugly within it.

The base 42 can have holes 47 that are located between the posts 48. The assist posts 38 are configured to be inserted from the bottom side of the base 42 through the holes 47. By applying force to the assist board 34, the tops 39 of the assist posts 38 will contact the perforated panel 60 and urge the perforated panel 60 towards the frame 65. This helps to uniformly press the panel 60, and thus the uppermost layer of bead, onto the adhesive sheet 78.

The assist board 34 can also have perforations 36. The perforations 36 allow the assist board 34 to slide along the posts 48 of the base 42, such that the assist board 34 rests atop of the base 34. One advantage to this arrangement is that it allows for easier more compact storage because the assist board 34 and base 42 can be stored together as one unit.

Operation

Referring to FIGS. 1A-4, in some implementations the beading board apparatus is operated by first sliding the perforated panel 60 vertically down the length of the posts 48, so that the perforated panel 60 rests on the base 42.

The user then places beads on the posts 48 so that they slide down the posts 48 and rest on the perforated panel 60 (see FIG. 1C). Beads can be placed on the posts 48 manually or by using a tool such as a dowel 86. If using a dowel 86 with a handle 88, the user places beads on the rod 90 of the dowel 86 so that the beads rest on the handle 88. When using a dowel with a concave groove 92, the user then brings the groove 92 of the dowel 86 into contact with a convex tip 50 of a post 48. The engagement between the concave groove 92 and convex tip 50 helps keep the dowel 86 in position over the post 48. In either case, the dowel 86 is tilted, thereby allowing beads to slide down the length of the rod 90 and onto the post 48. Once on the post, the beads can slide down towards the perforated panel 60.

Once the beads are placed on the posts 48, the user slides the frame 65 along the top portions 53 of the support members 52 by aligning the support member apertures 72 directly above the top portions 53 and lowering the frame 65. The frame 65 can then rest on the top surface 56 of the flanges 54, with the panel-receiving side 67 facing the perforated panel 60.

The user then slides the adhesive sheet 78 along the top portion 53 of the support members 52 by aligning the support member apertures 84 directly above the top portions 53 and lowering the adhesive sheet 78. The adhesive sheet 78 can then rest on the sheet-receiving side 66 of the frame 65, with the adhesive of the adhesive sheet 78 facing the perforated panel 60.

The user then slides the backing panel 74 along the top portion 53 of the support members 52 by aligning the support member apertures 76 directly above the top portions 53 and lowering the backing panel 74. The packing panel 74 can then rest on top of the adhesive sheet 78 (see FIG. 1D).

Alternatively, the support member apertures of the frame 65, adhesive sheet 78, and backing panel 74 can be aligned with each other and then together slide down the top portion 53 of the support members 52. The frame 65, adhesive sheet 78, and backing panel 74 are then secured to the beading board 40 using a locking mechanism, such as by screwing a bolt 59 onto a threaded portion 58 of a support member 52.

The user than moves the perforated panel 60 such that the perforated panel 60 slides along the posts 48 and presses the topmost layer of beads against the adhesive sheet 78. As a result, a layer of beads will adhere to the adhesive sheet 78. For example, the user can flip the beading board apparatus over so that gravity forces the perforated panel 60 and beads towards the adhesive sheet 78.

In another implementation, the user can grasp handles on the perforated panel 60 and pull the perforated panel 60 towards the adhesive sheet 78.

In another implementation, the user can use an assist board 34 (see FIGS. 6-8) to urge the perforated panel 60 and beads towards the adhesive sheet 78 by sliding assist posts 38 on the assist board 34 through holes 47 in the base 42, so that the assist posts 38 press against the perforated panel 60 and move the perforated panel 60 towards the adhesive sheet 78. After using the assist board 34 to urge the perforated panel 60 towards the adhesive sheet 78, the assist base 57 of the assist board 34 can rest within the recess 51 of the base 42.

Once a layer of beads is adhered to the adhesive sheet 78, the user unlocks the locking mechanism (e.g., unscrews bolts 59) and applies a protective material (e.g., wax paper or parchment paper) over the exposed layer of beads. The user then applies heat (e.g., using an iron, heat gun, or oven.) to the protective material, thereby causing the adhered layer of beads to melt and fuse together.

A number of embodiments of the invention have been described. Nevertheless, it will be understood that various modifications can be made without departing from the spirit and scope of the invention. For example, a frame 65 need not require a backing panel 74 to hold an adhesive sheet 78 using a locking mechanism. As another example, a backing panel 74 can instead be an identical structure to the frame 65 that sandwiches the adhesive sheet 78. Accordingly, other embodiments are within the scope of the following claims.

What is claimed is:

1. An apparatus for holding beads in a pattern, the apparatus comprising:
   a beading board having a base, wherein the base has a bottom side and a top side, wherein the beading board has a plurality of posts that project out from the top side of the base and that are configured to extend through holes in beads to hold the beads in lateral position relative to each other; and
   a perforated panel having perforations that are larger in width than the posts, wherein the perforated panel is configured to be removably placed on the beading board with the posts extending through the perforations, wherein the perforated panel is configured to slide along the posts, and wherein the perforated panel is configured to contact and urge the beads such that sliding of the perforated panel along the posts causes beads placed on the posts after the perforated panel to slide vertically along the length of the posts.

2. The apparatus of claim 1, wherein each post is configured to accept a plurality of beads along its length.

3. The apparatus of claim 1, wherein the base comprises a material selected from a group consisting of: cardboard, particle board, wood, plastic, and metal.

4. The apparatus of claim 1, wherein the perforated panel has a handle that can be grasped and used for manually moving the perforated panel along the length of the posts.

5. The apparatus of claim 1, wherein the apparatus further comprises:
a frame for holding an adhesive sheet in a fixed position relative to the base, wherein the frame is removably mountable on the beading board;
and wherein the beading board includes
a central zone on the top side of the base, wherein the central zone contains the posts, and
a perimeter zone on the top side of the base surrounding the central zone and containing a plurality of support members that project out from the top side of the base, each support member having a top portion, a bottom portion, and a flange that perpendicularly protrudes from the support member between the top portion and the bottom portion, wherein the flanges are configured to support the frame,
wherein the frame has a plurality of support member apertures that are configured to slide vertically along the length of the top portions of the support members and rest on top of the flanges.

6. The apparatus of claim 5, wherein the perforated panel is configured to rest on top of only the central zone.

7. The apparatus of claim 5, wherein the frame further comprises:
a central aperture that is configured to receive the perforated panel;
a panel-receiving side that is configured to face the perforated panel, wherein the panel-receiving side is configured to rest on top of the support member flanges; and
a sheet-receiving side that is configured to face away from the perforated panel.

8. The apparatus of claim 5, wherein the apparatus further comprises a locking mechanism for securing the frame and adhesive sheet onto the support members.

9. The apparatus of claim 8, wherein the locking mechanism is selected from a group consisting of: a bolt that is configured to screw onto a threaded portion of a support member, an end cap that is configured to receive a support member, a swiveling arm that is affixed to the base and is configured to pivot into a position covering the top portion of a support member, a pressure-sensitive spring clamp, and manual switching between a locked and unlocked position.

10. The apparatus of claim 5, further comprising an assist board, the assist board comprising:
an assist panel; and
a plurality of assist posts that project away from the assist panel, wherein the central zone of the base has holes located between the posts and the assist posts are capable of being inserted through the holes of the base by applying force to the assist panel thereby urging the perforated panel towards the frame, wherein the assist posts are configured to enter the holes through the bottom side of the base and exit the holes through the top side of the base.

11. The apparatus of claim 1, further comprising a dowel, the dowel comprising:
a rod that is configured to receive beads having the topological shape of a torus;
a first end for grasping the dowel; and
a second end for loading one or more beads onto the rod, wherein the dowel's second end is configured to contact a post, thereby allowing the one or more beads to slide along the length of the rod and ultimately down the length of the post towards the base.

12. The apparatus of claim 11, wherein the dowel's second end has a concave groove and the post has a convex tip, wherein the concave groove is configured to complementarily accept the convex tip.

13. The apparatus of claim 11, wherein the first end is a handle having a width that is greater than the width of the rod.

14. A method for fusing beads into a specific pattern, comprising:
placing a plurality of beads on posts that extend from a beading board through perforations in a perforated panel;
placing an adhesive sheet in contact with ends of the posts;
moving the perforated panel such that the perforated panel slides along the posts and presses the plurality of beads against the adhesive sheet; and
applying heat to the plurality of beads that are adhered to the adhesive sheet to cause the beads to fuse together.

15. The method of claim 14, wherein the step of moving the perforated panel is accomplished by sliding assist posts on an assist board through holes in the beading board, so that the assist posts press against the perforated panel and move the perforated panel towards the adhesive sheet.

16. The method of claim 14, wherein the step of applying heat to the plurality of beads on the adhesive sheet further comprises placing a protective material over the plurality of beads.

17. The method of claim 16, wherein the protective material is selected from a group consisting of: wax paper and parchment paper.

18. The method of claim 17, wherein the heat applied to the protective material is from a heat source that is selected from a group consisting of: an iron, heat gun, and oven.

19. The method of claim 14, wherein the placing of the plurality of beads onto the posts is accomplished using a dowel, wherein a bead slides along the length of the dowel and then down the length of a post on the beading board.

20. The method of claim 19, wherein the dowel is configured to hold a plurality of beads, the posts are configured to accept a plurality of beads, and the beading board is capable of holding multiple layers of a plurality of beads.

* * * * *